(12) United States Patent  (10) Patent No.: US 7,529,007 B2
Angal et al.  (45) Date of Patent: May 5, 2009

(54) METHODS OF IDENTIFYING THE TYPE OF A DOCUMENT TO BE SCANNED (75) Inventors: Aditya J. Angal, Lexington, KY (US); Mahesan Chelvayohan, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 530 days.

(21) Appl. No.: 11/149,995

(22) Filed: Jun. 10, 2005

(65) Prior Publication Data

US 2006/0279802 A1 Dec. 14, 2006

(51) Int. Cl.
H04N 1/40 (2006.01)
(52) U.S. Cl. ........................ 358/520; 358/462; 382/164; 382/176
(58) Field of Classification Search ................ 358/462, 358/521, 522, 523, 518, 520; 382/165, 171, 382/176, 164, 167, 162
See application file for complete search history.

(56) References Cited

U.S. PATENT DOCUMENTS

| 5,138,671 | A | * | 8/1992 | Yokoyama | ................. | 382/172 |
| 5,177,602 | A | * | 1/1993 | Fujimori | .................... | 358/522 |
| 5,251,023 | A | | 10/1993 | Arimoto et al. | | |
| 5,287,204 | A | | 2/1994 | Koizumi et al. | | |
| 5,420,704 | A | * | 5/1995 | Winkelman | ................. | 358/520 |
| 5,420,938 | A | | 5/1995 | Funada et al. | | |
| 5,495,428 | A | * | 2/1996 | Schwartz | .................... | 382/164 |
| 5,724,440 | A | | 3/1998 | Funada et al. | | |
| 5,748,773 | A | | 5/1998 | Tashiro et al. | | |
| 5,786,906 | A | | 7/1998 | Shishizuka | | |
| 5,990,876 | A | | 11/1999 | Shyu | | |
| 6,035,058 | A | | 3/2000 | Savakis et al. | | |
| 6,118,895 | A | * | 9/2000 | Hirota et al. | ................. | 382/165 |
| 6,181,819 | B1 | | 1/2001 | Arimoto et al. | | |
| 6,198,841 | B1 | * | 3/2001 | Toyama et al. | ............... | 382/164 |
| 6,377,703 | B1 | * | 4/2002 | Yeung | ......................... | 382/173 |
| 6,504,628 | B1 | * | 1/2003 | Kanno et al. | ................. | 358/522 |
| 6,628,833 | B1 | * | 9/2003 | Horie | ......................... | 382/176 |
| 6,718,878 | B2 | * | 4/2004 | Grosso et al. | ............... | 101/484 |
| 6,757,081 | B1 | * | 6/2004 | Fan et al. | ..................... | 358/474 |
| 6,760,133 | B1 | | 7/2004 | Yamada | | |
| 6,807,301 | B1 | * | 10/2004 | Tanaka | ........................ | 382/169 |
| 6,868,183 | B1 | * | 3/2005 | Kodaira et al. | .............. | 382/203 |
| 6,900,902 | B1 | * | 5/2005 | Tanaka | ....................... | 358/1.13 |
| 6,983,068 | B2 | * | 1/2006 | Prabhakar et al. | ........... | 382/162 |
| 6,998,628 | B2 | * | 2/2006 | Chelvayohan | ......... | 250/559.01 |
| 7,035,459 | B2 | * | 4/2006 | Ishiga | ........................ | 382/166 |
| 7,072,506 | B1 | * | 7/2006 | Hirota et al. | ................. | 382/162 |
| 7,099,042 | B2 | * | 8/2006 | Yaguchi | ...................... | 358/1.9 |
| 7,146,039 | B2 | * | 12/2006 | Ishiga | ........................ | 382/166 |
| 7,366,350 | B2 | * | 4/2008 | Kajihara | ...................... | 358/518 |
| 7,379,594 | B2 | * | 5/2008 | Ferman et al. | .............. | 382/176 |
| 2002/0071041 | A1 | * | 6/2002 | Pine | ........................... | 348/222 |
| 2002/0136447 | A1 | | 9/2002 | Link et al. | | |

(Continued)

*Primary Examiner*—Kimberly A Williams
(74) *Attorney, Agent, or Firm*—Sutherland, Asbill & Brennan, LLP (57) ABSTRACT

Methods for establishing or configuring imaging device settings use the luminance and chrominance values of an original document. The document is identified as either a text document or a photograph based at least in part on the luminance values of the document's pixels, and identified as black and white or color document based at least in part on the chrominance values of the document's pixels. The settings of the imaging device may then be based at least in part on whether the document is a text or photograph, or black and white or color.

20 Claims, 2 Drawing Sheets

U.S. PATENT DOCUMENTS

| | | | |
|---|---|---|---|
| 2003/0026477 A1* | 2/2003 | Ishiga | 382/166 |
| 2003/0128396 A1* | 7/2003 | Fan | 358/3.27 |
| 2004/0156544 A1* | 8/2004 | Kajihara | 382/167 |
| 2004/0196509 A1 | 10/2004 | Cousins et al. | |
| 2004/0207882 A1 | 10/2004 | Ahmed et al. | |
| 2005/0053281 A1 | 3/2005 | Frazer | |
| 2005/0163374 A1* | 7/2005 | Ferman et al. | 382/176 |
| 2006/0140476 A1* | 6/2006 | Ishiga | 382/166 |
| 2007/0019257 A1* | 1/2007 | Li | 358/518 |
| 2007/0058211 A1* | 3/2007 | Kubota | 358/462 |

* cited by examiner

METHODS OF IDENTIFYING THE TYPE OF A DOCUMENT TO BE SCANNED

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to imaging devices, and more particularly, to methods by which imaging devices can determine or identify the type of a document to be scanned.

2. Description of the Related Art

Current imaging devices such as scanners or copiers often require users to specify the resolution, color mode, filtering, and other settings that are to be used when scanning an original document. Many users, however, do not know or understand these settings and many times choose incorrect or suboptimal settings for their original documents. When these incorrect or suboptimal settings are used by the imaging device, the users do not achieve the best performance from the imaging device for their original document.

Similarly, some imaging devices such as scanners require users to identify the type of original document or features of the original document to be scanned. The document type or features of the document specified by the user are then analyzed by the imaging device to determine the optimal settings to use when scanning the original document. Again, users may not understand the distinctions between the listed document types or features and therefore, do not select the appropriate document types or features. Therefore, an optimal scan of the original document may not be obtained.

Accordingly, there is a need for a method by which an imaging device may accurately and reliably identify the type of original document. There is also a need for altering the settings of an imaging device based on the identified document type.

SUMMARY OF THE INVENTION

The present invention allows an imaging device to identify the characteristics of an original document, which may include whether the document is a text document or photograph, or black and white or color. The imaging device can then set optimal scanning settings based upon these identified document type and/or characteristics.

According to an embodiment of the invention, there is disclosed a method of establishing device settings. The method includes determining luminance and chrominance values of pixels representing a document, identifying a first characteristic of the document as either a text document or a photograph based at least in part on the luminance values, and identifying a second characteristic of the document as substantially black and white or substantially color based at least in part on the chrominance values. The method may also include specifying settings of an imaging device based at least in part upon the first and second characteristics.

According to an aspect of the invention, identifying a first characteristic includes identifying a first characteristic based at least in part on a determination of the percentage of pixels having luminance values within a predetermined range of luminance values. Identifying a first characteristic may also include identifying a first characteristic based at least in part on a comparison of the percentage number of pixels having luminance values within a predetermined range of luminance values to luminance criteria.

Further, identifying the first characteristic may include identifying the first characteristic based at least in part on a measure of dispersion of the luminance values of at least a portion of the pixels. According to another aspect of the invention, identifying the first characteristic based at least in part on a measure of dispersion includes identifying the first characteristic based at least in part on a standard deviation of the luminance values of at least a portion of the pixels.

According to yet another aspect of the invention, identifying the second characteristic includes identifying the second characteristic based at least in part on a measure of dispersion of the chrominance values of at least a portion of the pixels. Identifying the second characteristic based at least in part on a measure of dispersion may also include identifying the second characteristic based at least in part on a standard deviation of the chrominance values of at least a portion of the pixels.

According to another embodiment of the invention, there is disclosed a method of determining the settings of a device. The method includes determining luminance values of a plurality of pixels representing a document, comparing the results of at least one calculation, based in part on at least some of the luminance values, to luminance criteria to identify the document as a text document or photograph, and determining settings for the imaging device based at least in part on the identification of the document as photograph or a text document. In the method, the at least one calculation may be the proportion of the plurality of pixels of the document having luminance values within a range of luminance values.

According to one aspect of the invention, the at least one calculation includes a measure of the dispersion of at least some of the luminance values. The measure of the dispersion may include a standard deviation of at least some of the luminance values. According to another aspect of the invention, the method may further include determining chrominance values of the plurality of pixels, and comparing the results of the at least one other calculation, based in part on at least some of chrominance values, to chrominance criteria to identify the document as substantially black and white or as substantially color.

According to yet another aspect of the invention, the at least one other calculation may include a measure of the dispersion of at least some of the chrominance values. The measure of dispersion of at least some of the chrominance values may also include a standard deviation of the at least some of the chrominance values. According to yet another aspect of the invention, determining settings for the imaging device may include determining settings for the imaging device based at least in part on the identification of the document as a substantially black and white document or as substantially a color document.

According to yet another embodiment of the invention, there is disclosed a method of document classification. The method of document classification includes determining chrominance values associated with a document, calculating at least one measure of dispersion using, at least in part, some of the chrominance values, and identifying the document as substantially a color document or substantially a black and white document based on the calculation.

According to one aspect of the invention, the at least one measure of dispersion may include a standard deviation for some of the chrominance values. According to another aspect of the invention, the method may also include determining luminance values associated with the document and calculating a proportion of a number of pixels of the document that are not substantially light or substantially dark pixels. The document may also be identified as a text document or a photograph based at least in part on the proportion of the number of pixels that are not substantially light or substantially dark pixels. Furthermore, according to an aspect of the invention, the method may include calculating a standard deviation for the luminance values associated with pixels that are not substantially light or substantially dark pixels. According to yet another aspect of the invention, the method includes identifying the document as a text document or a photograph based at least in part on the standard deviation for the luminance values not associated with substantially light pixels or substantially dark pixels.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

The present inventions now will be described more fully hereinafter with reference to the accompanying drawings, in which some, but not all embodiments of the invention are shown. Indeed, aspects of these inventions may be embodied in many different forms and should not be construed as limited to the embodiments set forth herein; rather, these embodiments are provided so that this disclosure will satisfy applicable legal requirements. Like numbers refer to like elements throughout.

It will be appreciated that each of the methods described herein may be implemented by software and/or hardware. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer-readable storage medium may be utilized including hard disks, CD-ROMs, flash drives, optical storage devices, magnetic storage devices, and the like, as are known in art.

The present invention is described below with reference to block diagrams and flowchart illustrations of methods, apparatuses (i.e., systems) and computer program products according to an embodiment of the invention. It will be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus (e.g., an Application Specific Integrated Circuit), such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
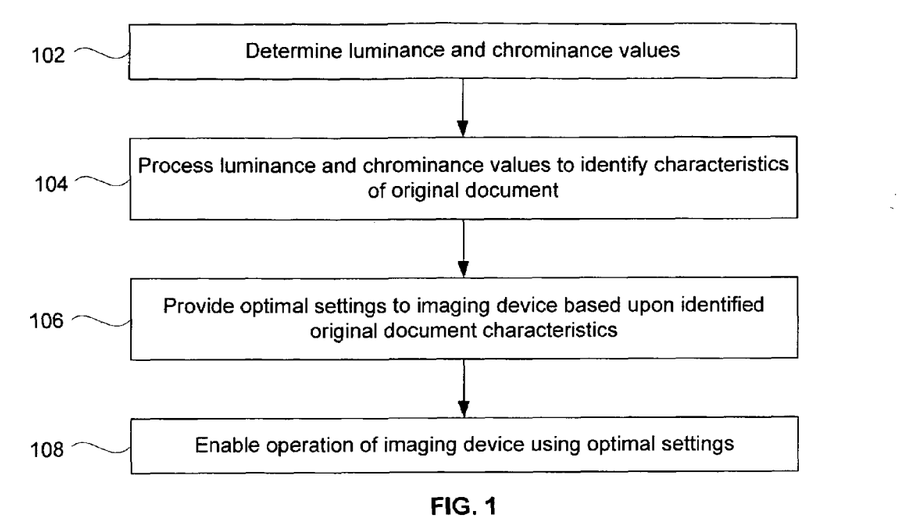
FIG. 1 shows a block diagram flow chart of a process for establishing imaging device settings based on the characteristics of an original document, according to an illustrative embodiment of the present invention.

Referring now to FIG. 1, illustrated in an exemplary method by which an imaging device, such as a scanner or printer, may automatically provide scan or copy settings based on characteristics of an original document. As shown in FIG. 1, an imaging device first determines luminance and chrominance pixel values corresponding to an image of an original document (block 102).

According to an embodiment of the present invention, the imaging device may determine luminance and chrominance pixel values directly from a preview scan ("pre-scan") image of the original document, as is known in the art. According to another embodiment of the present invention, the imaging device may determine pixel values corresponding to a color scheme or color system such as RGB (red-green-blue) pixel values, as is well-known to one of ordinary skill in the art. According to one aspect of the invention, each of the component RGB pixel values may be in a range of about 0 to 255. These RGB values may then be converted or decomposed to luminance and chrominance values, such as in a YCrCb system, as described in detail below.

As will be appreciated by those of ordinary skill in the art, in a YCrCb system, the Y component values correspond to a luminance value (e.g., black and white or light and dark) and the Cr and Cb component values correspond to chrominance (e.g., color) values. In particular, with respect to the Cr and Cb component values, Cr corresponds to the color-red component (i.e., red chrominance) and Cb corresponds to the color-blue component (i.e., blue chrominance). The conversion from RGB values to YCrCb values according to the present invention may be performed by software and/or by hardware internal or external to an imaging device. According to one aspect, RGB values having a range of 0 to 255 may be converted to YCrCb values having a range of 0 to 255. Such a conversion may be implemented according to the following exemplary operations, where Y, Cr, and Cb correspond to the YCrCb values and R, G, and B correspond to the RGB values:

$$Y = 0.2989*R + 0.5866*G + 0.1145*B$$

$$Cr = 0.500*R - 0.4183*G - 0.0816*B + 128$$

$$Cb = -0.1687*R - 0.3312*G + 0.500*B + 128$$

According to another embodiment of the present invention, software and/or hardware may convert RGB to YCrCb values according to the following exemplary operations:

$$Y = 0.299*R + 0.587*G + 0.114*B$$

$$Cr = 0.500*R - 0.41869*G - 0.08131*B + 127.5$$

$$Cb = -0.16875*R - 0.33126*G + 0.500*B + 127.5$$

It will be appreciated by one of ordinary skill in the art that other methods for generating YCrCb values may be used in accordance with methods of the present invention, including other methods for generating YCrCb values based on RGB values. As an illustrative example, Table 1 below illustrates YCrCb values for five (5) colors that may be calculated using one of the methods described above, or using other variations or alternatives known to those of skill in the art.

TABLE 1

| Color | (Y, Cr, Cb) values |
|---|---|
| White | (255, 128, 128) |
| Black | (0, 128, 128) |
| Gray | (128, 128, 128) |
| Red | (76, 255, 86) |
| Blue | (29, 108, 255) |

Additionally, one of ordinary skill in the art will appreciate that other luminance and chrominance systems besides YCrCb may be utilized. For example, L*a*b* values may be utilized, where L* values refer to luminance values, a* values refer to red-green chrominance values, and b* refers to blue-yellow chrominance values. As another example, luminance and chrominance systems utilizing YUV and YIQ values, as are well-known to those of ordinary skill in the art, may also be used.

Referring again to FIG. 1, once the luminance and chrominance pixel values have been determined (block 102), the luminance and chrominance pixel values may be Io compared to luminance and chrominance criteria to identify the characteristics of an original document (block 104), as will be described in detail with respect to FIG. 2. These characteristics may include the type of an original document, which may include whether the document is a photograph or text document, or whether the document is black and white or color. Based on these characteristics, the optimal settings may then be set for the operation of the imaging device (block 106). The imaging device may then be operated with optimal settings associated with the original document (block 108). According to an embodiment, a scanner may scan the original document at the optimal settings for resolution, color mode, and filtering. Additionally, a scanner or copier may print the original document using the optimal settings.

Figure 2:
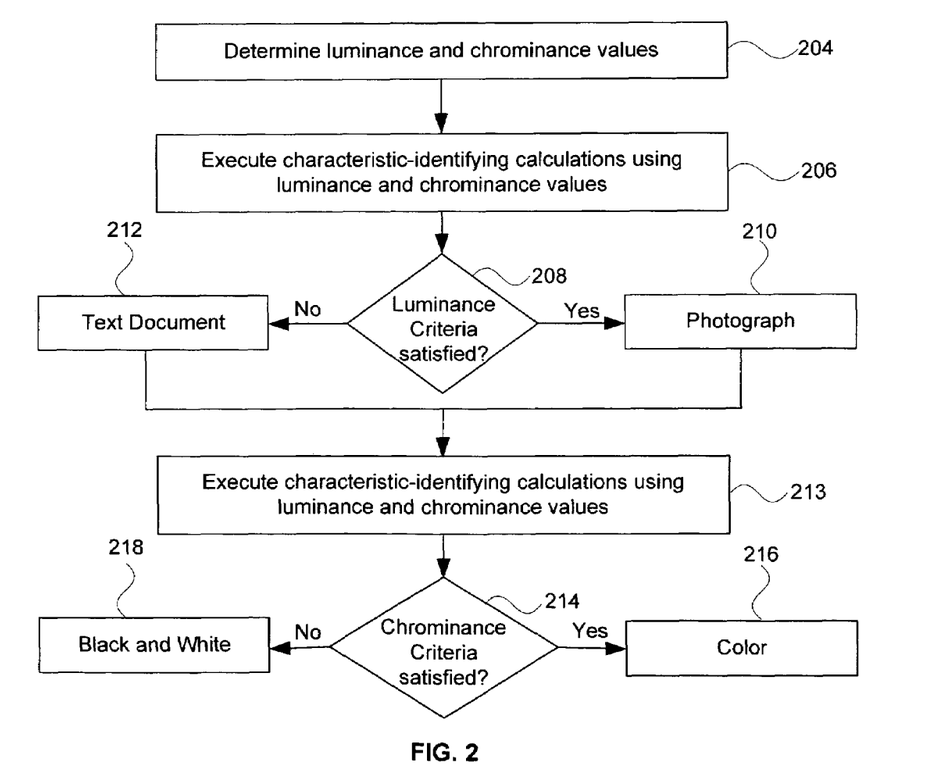
FIG. 2 is a block diagram flow chart illustrating the use of luminance and chrominance values to determine the characteristics of an original document, according to an embodiment of the present invention.

Referring now to FIG. 2, after the luminance and chrominance values have been determined (block 204), several characteristic-identifying calculations may be performed (blocks 206, 213) to identify characteristics of a scanned original document. The results of these characteristic-identifying calculations (blocks 206, 213) may be compared to luminance and chrominance criteria to determine the characteristics of the document, namely, if it is a text document or a photograph, or black and white or color.

According to an aspect of the invention, luminance values may be used to execute one or more characteristic-identifying calculations (block 206). A first characteristic-identifying calculation using luminance values can determine the ratio or proportion (e.g., percentage) of pixels within an original document that have luminance values falling within a mid-range of luminance values. The mid-range of luminance values include those luminance values that are not near white or black. As will be described in detail below, the ratio or proportion of pixels having luminance values within the mid-range may be used to identify a document as a text document or a photograph.

More specifically, according to an embodiment of the invention, the proportion (e.g., percentage) of pixels within the original document that have luminance values within a mid-range of luminance values may be calculated as the quantity YM. According to an embodiment of the invention, YM for a scanned original document may be calculated as the number of pixels in a pre-set midrange of luminance values divided by the total number of pixels. YM may therefore be expressed as a percentage. According to one embodiment, where luminance values may range from 0 to 255, the mid-range of luminance values may be between about 40 to about 215. According to another embodiment, the mid-range of luminance values may be between about 50 to about 200. One of ordinary skill in the art will recognize that this mid-range may change if the range of luminance values is more than or less than 0 to 255.

Another characteristic-identifying calculation based on luminance values may be the standard deviation of luminance values within a mid-range as described above. According to one aspect of the invention, the standard deviation of luminance values may be calculated as the quantity SDYM:

$$SDYM = \sqrt{\frac{1}{NM-1} \sum_{i=1}^{i=NM} (Yi - \overline{Y})^{\wedge}2}$$

where $\overline{Y}$ is the mean of the luminance values, Yi is within the mid-range, and NM is the number of pixels in the midrange. As explained in greater detail below, the standard deviation of luminance values may be useful in distinguishing text documents from photographs where there is a high occurrence of grey in an original document. It will also be appreciated by those of ordinary skill in the art that other measures of luminance value dispersion may also be calculated. As shown in FIG. 2, after the above-described characteristic-identifying calculations, e.g., YM and SDYM, are executed, the results are compared to luminance criteria (block 208) to determine whether a document is a text document or a photograph.

It will be appreciated that text documents generally include only dark pixels, i.e., Y (luminance) values near to 0 where Y=0 indicates fully black, or white or near-white pixels, i.e., pixels with Y (luminance) values near 255, where Y=255 indicates fully white. Therefore, text documents typically include very few pixels having Y values in a mid-range of approximately 50-200 in a 0 to 255 scale. As a result, the percentage of pixels within the original document having luminance values within a mid-range of luminance values, calculated as the value YM as described above, may be used to identify whether an original document is a text document. According to an illustrative embodiment of the invention, if YM is less than about thirty percent, then the document may be presumed to be a text document. According to another illustrative embodiment, if YM is less than twenty-five percent the document may be presumed to be a text document.

Although a measure of the percentage of pixels falling within a mid-range of luminance values is typically an excellent indicator of a text document, there may be exceptions when this measure is insufficient. For instance, when a text document is printed on a gray background there may be a large percentage of pixels having luminance values falling within a mid-range. In this event, although there may be a larger percentage of mid-range luminance values (e.g., greater than about twenty-five percent) due to the gray background, these mid-range luminance values will have a relatively small standard deviation SDYM, calculated as described above. According to an embodiment of the invention, a small standard of deviation, e.g., of less than about 10, 12, or 15, may be indicative of a document having a consistent shade that may be typical of a text document with a gray background or gray shading.

In contrast to text documents, photographs typically contain many shades of gray, resulting in a significant number of mid-range Y values. According to one embodiment of the present invention, photographs are presumed to have greater than about twenty-five percent of the luminance values within a mid-range. According to another embodiment, photographs may have greater than about thirty percent of the luminance values within a mid-range. In addition, these mid-range values may have a relatively larger standard deviation based upon the inclusion of many shades of gray. Therefore, these mid-range luminance values may have a standard deviation of greater than about 10, 12, or 15.

The present invention exploits the above-described differences in pixel luminance distribution between text documents and photographs. More specifically, the present invention compares the results of the characteristic-identifying calculations based on luminance values, e.g., YM and SDYM, to luminance criteria to distinguish text documents from photographs. According to an embodiment of the present invention, photographs may be presumed to satisfy the luminance criteria YM>0.25 and SDYM>10, while documents not satisfying those luminance criteria are presumed to be text documents (block 208). Table 2 shows a comparison of illustrative original documents and exemplary YM and SDYM values that satisfy or fail to satisfy the YM>0.25 and SDYM>10 luminance criteria:

TABLE 2

| Document Characteristics | YM and SDYM Values: |
|---|---|
| Text Document (printed on a luminous background like white paper) | YM ≦ 0.25 |
| Text Document (printed on a dull background like gray paper) | YM > 0.25 and SDYM ≦ 10 |
| Photographs: | YM > 0.25 and SDYM > 10 |

According to another embodiment of the present invention, a photograph may be presumed if the luminance criteria YM>0.30 and SDYM>12 are satisfied. It will be appreciated by one of ordinary skill in the art that the luminance criteria, including the illustrative values illustrated in Table 2 for documents having different characteristics, are exemplary. The present invention may be implemented using different luminance criteria from that described above, including luminance criteria utilizing only one of the values YM or SDYM, or using luminance criteria based on other characteristic-identifying calculations. The luminance criteria may also utilize different ranges of Y values, such that the criteria are not based on luminance values in a scale of 0 to 255. If luminance values other than those provided through YCrCb are utilized, then the values shown in Table 2 may be modified accordingly without departing from embodiments of the present invention.

Furthermore, in the illustrative embodiment of FIG. 2, if the luminance criteria is satisfied (block 208), then the original document is presumed to be a photograph (block 210). On the other hand, if the luminance criteria is not satisfied (block 208), then original document is presumed to be a text document (block 212). The luminance criteria may also be established in the reverse such that the satisfaction of the luminance criteria results in the presumption that the document is a text document, and the failure to satisfy the criteria results in the presumption that the document is a photograph.

After the document is determined to be a text document or a photograph based on a comparison of the characteristic-identifying calculations using luminance values to the luminance criteria, characteristic-identifying calculations may be executed using chrominance values. As explained in detail below, these may be compared to chrominance criteria to determine if a document is black and white or color.

According to an embodiment of the invention, characteristic-identifying calculations based on chrominance values of an original document may include the mean of the chrominance values Cb and Cr, calculated as $\overline{Cb}$ and $\overline{Cr}$, respectively. According to one aspect of the invention, $\overline{Cb}$ and $\overline{Cr}$ may be calculated as:

$$\overline{Cb} = \frac{\sum_{i=1}^{N} Cbi}{N} \text{ and } \overline{Cr} = \frac{\sum_{i=1}^{N} Cri}{N}$$

where N is the total number of pixels in the original document. Another calculation based on chrominance values may be the standard deviations of the Cb and Cr values. These standard deviations may be calculated as SDCb and SDCr, respectively:

$$SDCb = \sqrt{\frac{1}{N-1} \sum_{i=1}^{i=N} (Cbi - \overline{Cb})^{\wedge}2}$$

and $$SDCr = \sqrt{\frac{1}{N-1} \sum_{i=1}^{i=N} (Cri - \overline{Cr})^{\wedge}2}$$

It will be appreciated by those of ordinary skill in the art that other measures of dispersion of chrominance values of an original document may be calculated in addition to or instead of the standard deviations described above. According to another embodiment of the invention, another characteristic-identifying calculation based on chrominance values may be the absolute value of $\overline{Cr}$ and $\overline{Cb}$ calculated from a median value, for instance, calculated according to the equations |$\overline{Cr}$− median value| and |$\overline{Cb}$− median value| where the median value is approximately 127.5 for Cr and Cb values having ranges from 0 to 255. In other embodiments, the median value may be different, which may be particularly important if the Cr and Cb values have a range other than from 0 to 255.

It will be appreciated that Cr and Cb values correspond to two color axes, and any color may be a point in this coordinate system. A normal color photograph or color text document will typically have multiple color points in Cr-Cb space. Cb values and Cr values of these color points will have a broad distribution such that either one or both of the standard deviations SDCb and SDCr will have a large value (i.e., a larger variation). The product of the standard deviations SDCb and SDCr may be large for normal color photographs and color text documents. However, where the photograph or text document is a monotonous color (e.g., substantially a single color), the product of the standard deviations SDCb and SDCr may be low. Accordingly, in this case, proper color identification may be made by evaluating the mean values of Cb and Cr ($\overline{Cb}$ and $\overline{Cr}$) compared to a median value. If the photograph or text document is color, albeit a monotonous color, then at least one of the $\overline{Cb}$ and $\overline{Cr}$ values are expected to be far away from the median value, which may signify a color component.

According to an embodiment of the present invention, color documents (either with many colors or with a monotonous color) are presumed to be those that satisfy the chrominance criteria: SDCr×SDCB>50 or |$\overline{Cr}$−127.5|>10 or |$\overline{Cb}$−127.5|>10 (blocks 214, 216). Accordingly, documents that do not satisfy the above criteria are presumed to be black and white documents (block 218). Table 3 shows a comparison of illustrative original documents and exemplary SDCr, SDCb, $\overline{Cr}$, and $\overline{Cb}$ values that satisfy or fail to satisfy the SDCr×SDCB>50 or |$\overline{Cr}$−127.5|>10 or |$\overline{Cb}$−127.5|>10 chrominance criteria:

TABLE 3

| Document Characteristics | Cr and Cb Related Values: |
|---|---|
| Normal color photographs/text documents | SDCr × SDCb > 50 |
| Monotonous color photographs/text documents | |$\overline{Cr}$ − 127.5| > 10 or |$\overline{Cb}$ − 127.5| > 10 |

One of ordinary skill in the art will appreciate that the values illustrated in Table 3 are exemplary, and that alternative values may be used to identify a document as black and white or color. For example, according to another embodiment of the present invention, a normal color photograph/text document may be determined according to the criteria SDCr×SDCb>60. In addition, a monotonous color photograph/text document may satisfy the criteria |$\overline{Cr}$−128|>15 or |$\overline{Cb}$−128|>15. If chrominance values other than those provided through YCrCb values are utilized, then the values shown in Table 3 may have to be modified without departing from embodiments of the present invention. Alternatively, the other chrominance values may be scaled to be Cr and Cb values in the range of 0 to 255.

Finally, it will be appreciated by one of ordinary skill in the art that each of the standard deviation calculations described above with respect to the characteristic-identifying calculations based on luminance and chrominance were based on sampled data. In alternative embodiments, population standard deviation may also be used, and calculated for luminance and chrominance values according to the algorithms:

$$SDYM = \sqrt{\frac{1}{NM}\sum_{i=1}^{i=NM}(Yi-\overline{Y})^{\wedge}2};$$

$$SDCb = \sqrt{\frac{1}{N}\sum_{i=1}^{i=N}(Cbi-\overline{Cb})^{\wedge}2};$$

and $$SDCr = \sqrt{\frac{1}{N}\sum_{i=1}^{i=N}(Cri-\overline{Cr})^{\wedge}2}$$

One of ordinary skill will also recognize that standard variations and variances may be closely related. The standard deviation can simply be the square root of the corresponding variance. Thus, according to alternative embodiments of the present invention, the variance may be used instead of the standard deviation. If the variance is utilized, then the luminance and chrominance criteria may use values that are scaled accordingly. For example, as would be appreciated by one of ordinary skill in the art, a criteria such as standard deviation SD>10 may become variance >100.

Based upon the luminance criteria and the chrominance criteria, a scan original document may be classified as a black and white text document, a black and white photograph, a color text document, or a color photograph. It will be appreciated that although the embodiment described with respect to FIG. 2 shows the separate execution of characteristic-identifying calculations using luminance and chrominance values (blocks 206, 213), the methods of the present invention may be implemented where all of the characteristic-identifying calculations are calculated prior to the determination if the luminance criteria and chrominance criteria are satisfied. For instance, referring to FIG. 2, the characteristic-identifying calculations using chrominance values may be calculated along with the calculation of the characteristic-identifying calculations using luminance values (block 206). It will also be appreciated that the order in which the luminance and chrominance criteria are determined to be satisfied are insignificant. Thus, a document may be presumed to be a black and white or color document before it is determined to be a text document or a photograph. These determinations may also be made in parallel. One of ordinary skill in the art will also recognize that the luminance criteria and the chrominance criteria may be combined into a single criteria in accordance with embodiments of the present invention.

Finally, once the characteristics of an original document have been identified, the imaging device may be provided with the optimal settings for the original document as described with respect to FIG. 1. According to an embodiment, an imaging device may alter settings for scanning or copying an original document, including altering settings for resolution, color mode, and filtering.

Figure 3:
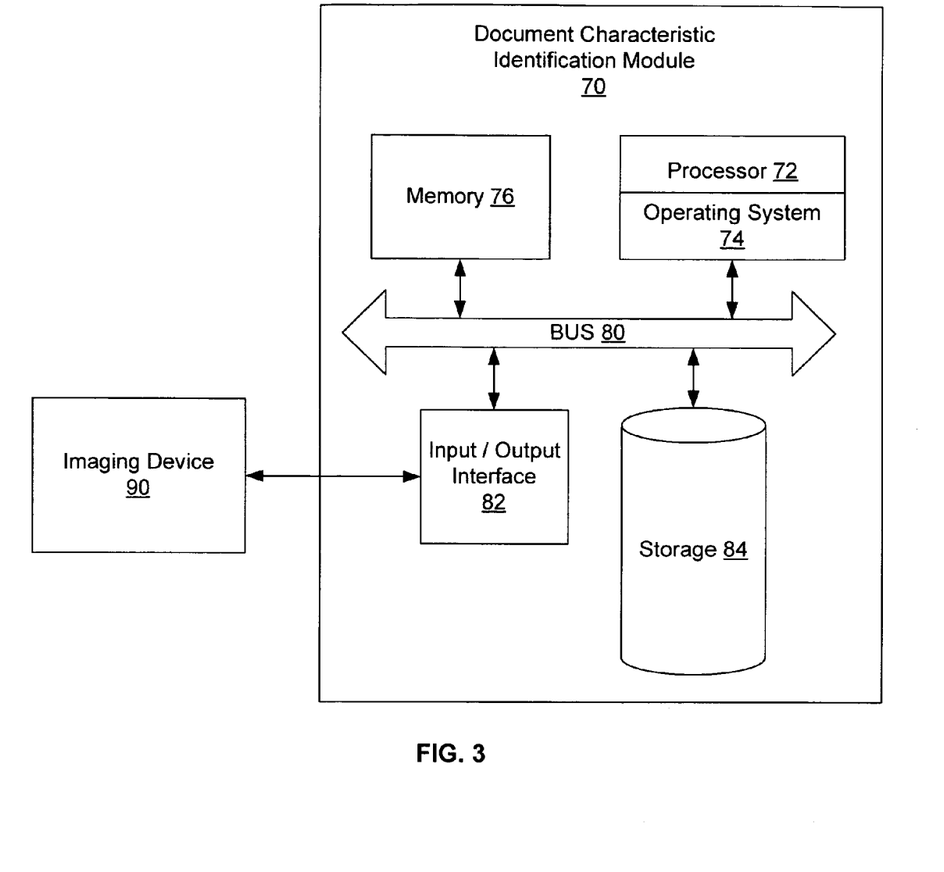
FIG. 3 is an illustrative document characteristic identification module for implementing the methods of the present invention, according to an embodiment of the present invention.
Figure 4:
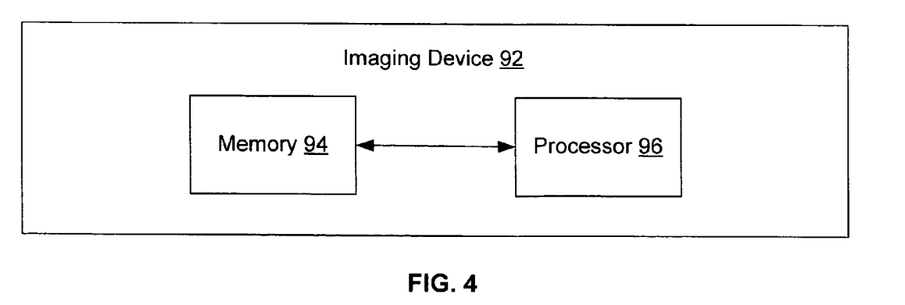
FIG. 4 is an illustrative imaging device for implementing the methods of the present invention, according to an embodiment of the present invention.

Next, illustrative software and/or hardware for implementing the methods described herein will be described with respect to FIGS. 3 and 4. The examples described with respect to FIGS. 3 and 4 are intended to be illustrative only as the present invention may take the form of an entirely hardware embodiment, an entirely software embodiment or an embodiment combining software and hardware aspects. It will be appreciated that the present invention may also take the form of a computer program product on a computer-readable storage medium having computer-readable program code means embodied in the storage medium.

An illustrative document characteristic identification module for implementing the methods described herein is illustrated in FIG. 3. The document characteristic identification module generally includes a processor 72, operating system 74, memory 76, input/output (I/O) interface 82, storage 84 and bus 80. The bus includes data and address bus lines to facilitate communication between the processor 72, operating system 74 and the other components within the module 70, including the memory 76, the input/output (I/O) interface 82 and the storage 84.

The processor 72 executes the operating system 74, and together the processor 72 and operating system 74 are operable to execute functions implemented by the document characteristic identification module 70, including software applications stored in the memory 76, as is well known in the art. Generally, the memory 76 may receive RGB values or luminance values from the imaging device 90 through I/O interface 82. The processor is in communication with the I/O interface 82 to control and communicate with I/O devices, such as an imaging device 90. According to an embodiment, the imaging device 90 may be a scanner. According to another embodiment, the imaging device 90 may be both a scanner and a printer. Although the imaging device 90 is illustrated as external to the document characteristic identification module 70, it will be appreciated that the document characteristic identification module 70 may alternatively be located wholly or partly internal to the imaging device 90.

The storage 84 of the document characteristic identification module 70, which is connected to the bus 80 by an appropriate interface, may include read-only memory, a hard disk drive, a floppy disk drive, a CD-Rom drive, a flash drive, or optical disk drive, for storing information on various computer-readable media, such as a hard disk, a removable magnetic disk, or a CD-ROM disk. In general, the purpose of the storage 84 is to provide non-volatile storage to the document characteristic identification module 70. The storage may include one or more luminance and chrominance criteria against which the results of the characteristic-identifying calculations may be compared.

Specifically, to implement the methods described herein with respect to FIGS. 1 and 2, the processor 72 and operating system 74 are operable to obtain and process the luminance and chrominance values to identify characteristics of an original document. According to one aspect of the invention, memory 76 may include one or more algorithms for executing the methods and processes described above with respect to FIGS. 1 and 2, including the determination of luminance and chrominance values of an original document, the execution of the characteristic identifying calculations, and the comparison of the results of those equations against luminance and chrominance criteria.

It is important to note that the computer-readable media described above with respect to the memory 76 and storage 84 could be replaced by any other type of computer-readable media known in the art. Such media include, for example, magnetic cassettes, flash memory cards, digital video disks, and Bernoulli cartridges. It will be also appreciated by one of ordinary skill in the art that one or more of the document characteristic identification module components may be located geographically remotely from other document characteristic identification module 70 components.

FIG. 4 illustrates another illustrative embodiment of hardware and/or software for implementing the methods described above with respect to FIGS. 1 and 2. Specifically, the methods described with respect to FIGS. 1 and 2 may be implemented by software and hardware located entirely within an imaging device, such as a scanner or a multi-function product including scanning, printing, and copying functions. As shown in FIG. 4, the imaging device 92 may include a memory 94 in communication with a processor 96. The memory 94 may include read only memory (ROM), random access memory, a magnetic drive, removable storage media, and other volatile and non-volatile memories. According to an illustrative embodiment, the memory 94 may be firmware (e.g., a ROM) that includes software instructions executable by the processor 96 for implementing one or more methods described in FIGS. 1 and 2. Thus, the imaging device 92 itself may be operable to perform one or more of the methods described in FIGS. 1 and 2.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of establishing device settings, comprising:
   determining luminance and chrominance values of pixels representing a document;
   identifying a first characteristic of the document as either a text document or a photograph based at least in part on the luminance values, comprising calculating a standard deviation of the luminance values of a percentage of pixels falling within a predetermined range of luminance values, and determining the first characteristic based upon the calculation;
   identifying a second characteristic of the document as substantially black and white or substantially color based at least in part on the chrominance values, comprising calculating a standard deviation of the chrominance values of the pixels and determining the second characteristic based upon the calculation; and
   specifying settings of an imaging device based at least in part upon the first and second characteristics.

2. The method of claim 1, wherein identifying a first characteristic comprises identifying a first characteristic based at least in part on a determination of the percentage of pixels having luminance values within a predetermined range of luminance values.

3. The method of claim 2, wherein identifying a first characteristic further comprises identifying a first characteristic based at least in part on a comparison of the percentage number of pixels having luminance values within a predetermined range of luminance values to luminance criteria.

4. The method of claim 2, wherein identifying the first characteristic comprises identifying the first characteristic based at least in part on a measure of dispersion of the luminance values of at least a portion of the pixels.

5. The method of claim 1, wherein identifying the second characteristic comprises identifying the second characteristic based at least in part on a measure of dispersion of the chrominance values of at least a portion of the pixels.

6. The method of claim 5, wherein identifying the second characteristic based in part on a measure of dispersion comprises identifying the second characteristic based at least in part on a variance of the chrominance values of at least a portion of the pixels.

7. The method of claim 1, wherein the second characteristic is further based on absolute value of a mean of the chrominance values calculated from a median of the chrominance values.

8. The method of claim 7, wherein a color photograph is identified if the standard deviation of the chrominance values exceeds a third predetermined value and if the absolute value of the mean of the chrominance values calculated from the median is less than a fourth predetermined value.

9. The method of claim 1, wherein identifying the first characteristic further comprises calculating a percentage of pixels within a predetermined mid-range of luminance values and comparing the calculated percentage of pixels to a predetermined value.

10. The method of claim 1, wherein identifying the second characteristic further comprises calculating the absolute value of a mean of the chrominance values relative to a median of the chrominance values and comparing the calculation to a predetermined value.

11. A method of determining the settings of an imaging device, comprising:
   determining luminance values of a plurality of pixels representing a document;
   comparing the results of at least one calculation, based in part on at least some of the luminance values, to luminance criteria to identify the document as a text document or photograph, comprising calculating a standard deviation of the luminance values and comparing the calculation to a first predetermined value, and calculating a percentage of pixels within a predetermined mid-range luminance values and comparing the calculated percentage of pixels to a second predetermined value; and
   determining settings for the imaging device based at least in part on the identification of the document as photograph or a text document, wherein the at least one calculation is based upon a proportion of the plurality of pixels of the document having luminance values within a range of luminance values.

12. The method of claim 11, further comprising:
   determining chrominance values of the plurality of pixels; and
   comparing the results of the at least one other calculation, based in part on at least some of chrominance values, to chrominance criteria to identify to document as substantially black and white or substantially color document.

13. The method of claim 12, wherein the at least one other calculation comprises a measure of the dispersion of at least some of the chrominance values.

14. The method of claim 13, wherein the measure of dispersion comprises a standard deviation of the at least some of the chrominance values.

15. The method of claim 12, wherein determining settings for the imaging device comprises determining settings for to imaging device based at least in part on the identification of the document as substantially black and white document or substantially color.

16. A method of document classification, comprising:
   determining chrominance values associated with a document;
   calculating at least one measure of dispersion using, at least in part, some of the chrominance values, comprising calculating one of a standard deviation of the chrominance values and a variance of the chrominance values and comparing the calculation to a first predetermined value, and calculating the absolute value of a mean of the chrominance values relative to a median of the chrominance values and comparing the calculation to a second predetermined value; and
   identifying the document as substantially a color document or substantially a black and white document based on the calculation.

17. The method of claim 16, further comprising determining luminance values associated with the document, and calculating a proportion of a number of pixels of the document that are not substantially light or substantially dark pixels.

18. The method of claim 17, further comprising identifying the document as a text document or a photograph based at least in part on the proportion of the number of pixels that are not substantially light or substantially dark pixels.

19. The method of claim 18, further comprising calculating a standard deviation for the luminance values associated with pixels tat are not substantially light or substantially dark pixels.

20. The method of claim 19, further comprising identifying the document as a text document or a photograph based at least in part on the standard deviation for the luminance values not associated with substantially light pixels or substantially dark pixels.

* * * * *